June 12, 1934.   H. CONOVER   1,962,429
BEARING CONSTRUCTION
Original Filed Nov. 28, 1930
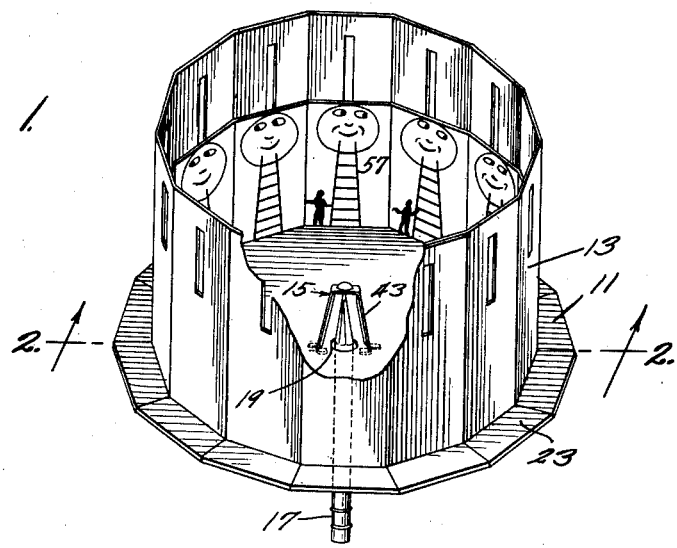
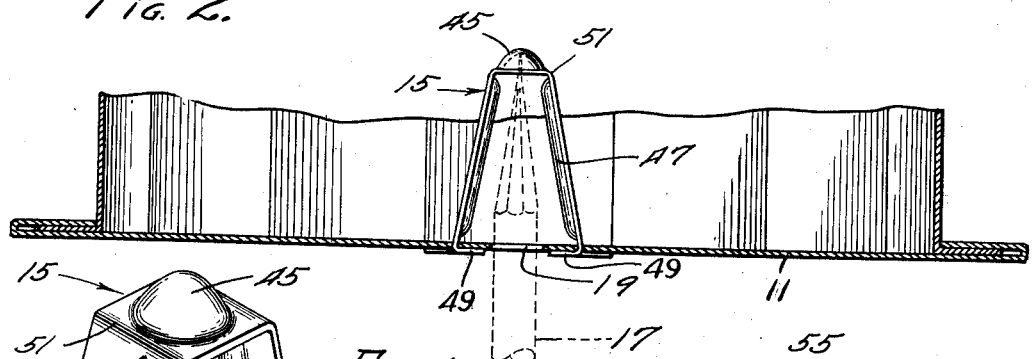
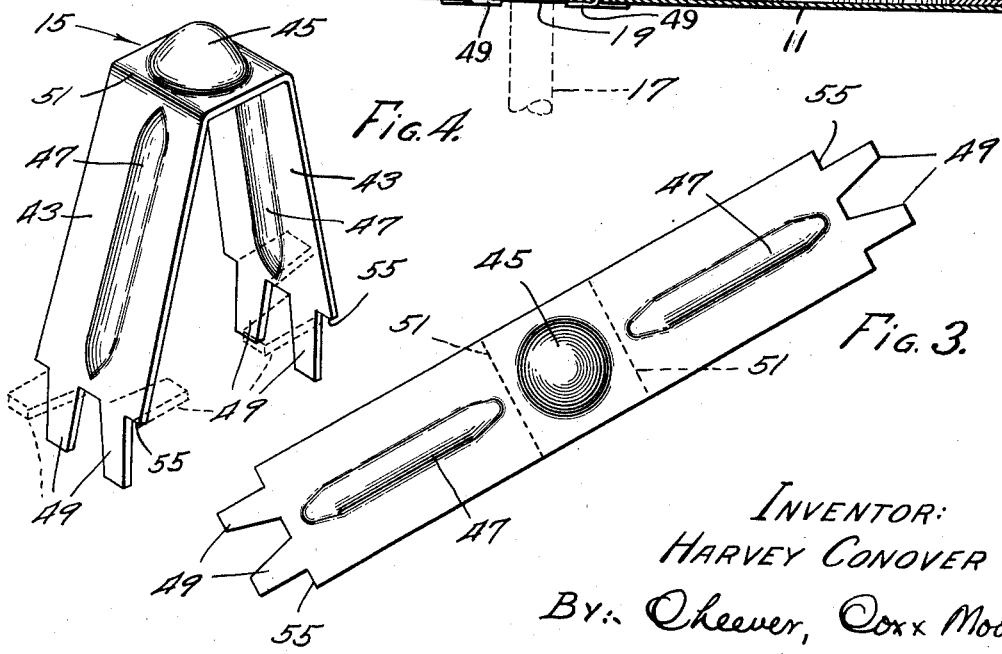
INVENTOR:
HARVEY CONOVER
BY: Cheever, Cox & Moore
ATTYS.

Patented June 12, 1934

UNITED STATES PATENT OFFICE 1,962,429

BEARING CONSTRUCTION

Harvey Conover, Evanston, Ill.

Original application November 28, 1930, Serial No. 498,738, now Patent No. 1,925,136, dated September 5, 1933. Divided and this application November 12, 1931, Serial No. 574,617

10 Claims. (Cl. 308—159)

My invention relates in general to support structures, the same comprising subject matter divided from my co-pending application, Serial Number 498,738, filed November 28, 1930, now Patent No. 1,925,136, September 5, 1933, and the same has more particular reference to a novel pivot bearing and method of making and using same.

An important object of the invention resides in a simple and inexpensive journal construction particularly useful for pivotally supporting relatively light weight rotational devices.

Another important object is to provide a journal structure for use in connection with a pointed pencil or its equivalent to provide a rotating support, efficient in operation, self-adjusting and self-lubricating, simple in construction and cheap to make, and, for these and other reasons, especially well adapted for use in toys and similar devices where an inexpensive pivot is wanted.

Another object of the invention is to provide a collapsible pivot structure which can be packed flat for merchandising purposes.

Another object is to utilize a cheap sheet metal stamping as a pivot bearing.

Still another object resides in the method of revolubly supporting a rotating body.

Numerous other objects and advantages of the invention will be apparent as the same is more fully understood from the following description, which, taken in connection with the accompanying drawing, discloses a preferred form of the invention.

Referring to the drawing:

Figure 1 is a perspective view of a rotatable device embodying my present invention;

Figure 2 is a vertical section taken substantially along the line 2—2 in Figure 1; and Figures 3 and 4 are perspective views of a sheet metal stamping respectively in flat and in formed condition in accordance with the teachings of my present invention.

To illustrate my invention, I have shown on the drawing a rotatable device comprising a kinetoscope provided with a novel bearing construction 15 embodying my present invention.

The kinetoscope comprises a disk or base 11 and an upstanding annular or circular wall portion 13 provided with spaced slots 35 through which the adjacent pictures on an action strip 57 may be viewed rapidly and in succession by rotating the kinetoscope on its bearing 15 in accordance with the well known operating principle of the kinetoscope.

The bearing comprises a piece of bendable metal 43 preferably tin, which is or may be formed as a stamping in the shape of a flat elongated strip provided centrally with a conical depression 45 extending upwardly in the strip and ridges 47 spaced longitudinally in the strip on either side of the depression 45. The ridges and conical depression may be formed in the same direction in the strip if desired, but, for the purpose hereinafter more clearly explained, I prefer to form the conical depression upwardly in the strip while the elongated ridges are pressed downwardly therein so as to form ridges in the underside of the strip while the conical depression forms a mound in the upper side of the strip. At each end of the strip, tongues 49 may be formed. The bearing is assembled in the kinetoscope by bending the parts, containing the ridges 47, downwardly from the center portion containing the cone-shaped depression 45 along the lines of bend 51. As formed, the strip will naturally bend along the lines 51 since the depressions 47 terminate a short distance from the cone-shaped portion 45 and the bend will always occur in these spaces since the remaining parts of the strip are stiffened by the elongated ridges. The strip, as bent for assembly in the kinetoscope, is illustrated in Figure 4 of the drawing. The bent strip may be assembled in position by pressing the flaps or prongs 49 through the disk 11 on either side of the perforation 19.

The strip 43 is also preferably formed with shoulders 55 extending outwardly of the prongs 49 and these shoulders engage the upper surface of the disc 11, when the prongs 49 are forced therethrough, to thus limit the distance to which the prongs may be forced through the disk. The prongs 49 are then clamped over beneath the disk 11 as indicated in Figures 1 and 4, to firmly fasten the bearing strip 43 in place. This bearing is extremely cheap to make and simple to install and yet is unusually effective when used in connection with a suitable pintle member 17. This pintle is inserted through the perforation 19 so that its point enters the conical depresson 45, as clearly illustrated in Figure 3 of the drawing. I prefer to utilize a printed "lead pencil" as the pintle member 17 whereby a graphitized bearing is provided which is exceptionally well adapted to maintain rotation for a long period of time. Graphite, as is well known, is a lubricant and the construction I have provided, when used in connection with an ordinary lead pencil, provides a bearing support of unusual efficiency. Any pointed pintle means, however, may be used with satisfactory results.

One of the important features of the construction I have described, is that it lends itself particularly well to the production of a neat compact package. When in disassembled condition, the walls 13 are demounted and folded flat and laid upon the disk 11 and the bearing strip 43 in flat condition as shown in Figure 3 may be arranged on the surface of the disk 11 with the conical depression 45 extending into the central depression 19 of the disk 11. When in this position, the remaining portion of the strip 43 will lie flat upon the upper surface of the disk, the depressions 47 extending upwardly for this purpose. Any suitable fastening means, such as mucilage, gummed paper, clips and the like, may be used to secure the strip to the disk in collapsed position. It will be obvious that the strip so assembled will occupy a minimum of space in the package.

It will be apparent from the foregoing description that I have provided a novel construction whereby an efficient, sturdy, frictionless bearing is produced—a bearing which can be packaged in a collapsed, substantially flat position.

I do not herein claim the zoetrope nor the method of producing animated pictures, since the same form the subject-matter of my co-pending applications, Serial Number 498,738, filed November 28, 1930, now Patent No. 1,925,136, issued September 5, 1933; and Serial Number 663,463, filed March 30, 1933.

It is thought that the invention and numerous of its attendant advantages will be understood from the foregoing description, and it is obvious that numerous changes may be made in the form, construction, and arrangement of the several parts without departing from the spirit or scope of my invention or sacrificing any of its attendant advantages, the form herein described being a preferred embodiment for the purpose of illustrating my invention.

Having thus described my invention, what I claim as new and desire to secure by Letters Patent is as follows:

1. In a device of the class described, a strip having a central conical depression, an elongated ridge formed in the strip on either side of and in line with the conical depression, said ridges terminating short of the conical depression whereby to define areas in which the strip may be bent intermediate the ridges and the depression, said strip having its ends formed with prongs arranged for insertion through a disk or card and being bendable beneath the card to affix the strip thereon whereby to provide a suitable bearing about which to rotate the device.

2. A collapsible bearing construction comprising a plate having a perforation and a member adapted to be mounted on said plate opposite the perforation, said member having a portion adapted to be connected to the plate and a portion providing a conical depression in line with the perforation and disposed in spaced relationship with respect to said perforation, said member comprising a strip of sheet metal having a cone-shaped offset portion providing the conical depression in one surface of the member, said off-set portion having a basal dimension substantially equal to the dimension of the perforation so that the member may be folded with respect to the plate with the conical portion entering the perforation when the device is collapsed.

3. A bearing structure comprising a plate having a perforation and a strip of configurated sheet metal adapted for assembly on the plate to extend upwardly of the perforation and to form therewith a journal or bearing, said plate having a depression formed therein and having depending means for attaching the strip to the plate with said depression in aligned spaced relationship with respect to the perforation of the plate, said depression being of substantially the same overall size as the perforation of the plate so that the strip may be laid flat on the plate when in disassembled condition with the depression of the strip entering the perforation of the plate in order thus to snugly assembly the collapsed parts in small compass.

4. A bearing structure comprising a plate having a perforation and a strip of configurated sheet metal adapted for assembly on the plate to extend upwardly of the perforation and to form therewith a journal or bearing, said plate having a depression formed therein and having depending means for attaching the strip to the plate with said depression in aligned spaced relationship with respect to the perforation of the plate, the overall diametral size of said depression being no larger than that of the perforation of the plate so that the strip may be laid flat on the plate when in disassembled condition with the depression of the strip entering the perforation of the plate in order thus to snugly assemble the collapsed parts in small compass.

5. In a device of the class described, a strip having a central conical depression, an elongated ridge formed in the strip on either side of and in line with the conical depression, said ridges terminating short of the conical depression whereby to define areas in which the strip may be bent intermediate the ridges and the depression, and means formed on the ends of said strip and adapted to connect said ends to a disc or card whereby to provide a suitable bearing to rotatably support a device.

6. In a journal for use with a pencil having an anti-friction pintle point, a revoluble device comprising a perforated disk, a metal strip having offset ends connected to said disk on either side of the perforation and having a center portion provided with a depression in line with the perforation to receive the anti-friction pintle point of a pencil inserted through the perforation.

7. In a journal for use with a pencil having an anti-friction pintle point, a revoluble device comprising a frame portion providing means providing an opening providing a collar for loosely embracing the sides of the pencil and through which the body of the pencil may be inserted, and a secondary frame comprising a strip having its opposite ends providing offset arms attached to the frame and having a portion intermediate said arms and spaced substantially above said opening and providing a depression in line to receive the anti-friction point of the pencil and co-operate therewith to provide an inexpensive anti-friction bearing about which the frame may rotate.

8. The combination with a pencil having a point comprising anti-friction material, of a revoluble device comprising a perforated member through which the body of the pencil may be inserted and a bent strip having arms connected to the perforated member and having a depression in line with the perforation of the member to receive the point of the pencil and co-operate with the anti-friction material whereby to provide an efficient bearing support.

9. A bearing structure comprising a plate having a perforation and a substantially U-shaped sheet-metal strip having arms adapted for connection with the pate on opposite sides of the perforation thereof and having a depression formed therein at the bottom of the U-shaped strip intermediate the arms thereof, said arms being connected to the plate in position to align the depression opposite the perforation in position to receive the point of a pintle inserted through the perforation of the plate whereby to provide a suitable bearing to rotatably support the plate on the pintle.

10. In a device of the class described, a member having a perforation, a strip adapted to be bent to generally U-shaped form to provide arms and a bearing portion intermediate the arms, said bearing portion being formed with a depression and the arms having prongs whereby to attach the arms to the member on opposite sides of the perforation thereof, said strip being mountable on the member with its depression in vertical alignment with said perforation whereby to provide a suitable bearing to rotatably support the device on the pintle.

HARVEY CONOVER.